(12) United States Patent
Vorderbruggen et al.

(10) Patent No.: US 9,168,565 B2
(45) Date of Patent: Oct. 27, 2015

(54) METHOD OF REDUCING DUST WITH SELF-ASSEMBLY COMPOSITES

(71) Applicant: Baker Hughes Incorporated, Houston, TX (US)

(72) Inventors: Mark Alan Vorderbruggen, Spring, TX (US); Christopher John Stephenson, Houston, TX (US); Naima Bestaoui-Spurr, The Woodlands, TX (US); Qi Qu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 283 days.

(21) Appl. No.: 13/784,586

(22) Filed: Mar. 4, 2013

(65) Prior Publication Data

US 2013/0192835 A1 Aug. 1, 2013

Related U.S. Application Data

(63) Continuation-in-part of application No. 13/283,405, filed on Oct. 27, 2011.

(51) Int. Cl.
*E21B 43/267* (2006.01)
*C09K 8/80* (2006.01)
*B05D 1/00* (2006.01)
*E21B 37/00* (2006.01)
*E21B 43/04* (2006.01)
*B82Y 30/00* (2011.01)

(52) U.S. Cl.
CPC ............. *B05D 1/007* (2013.01); *C09K 8/805* (2013.01); *E21B 37/00* (2013.01); *E21B 43/04* (2013.01); *E21B 43/267* (2013.01); *B82Y 30/00* (2013.01); *C09K 2208/10* (2013.01)

(58) Field of Classification Search
CPC .. C09K 8/805; C09K 2208/10; E21B 43/267; E21B 43/04
See application file for complete search history.

(56) References Cited

U.S. PATENT DOCUMENTS

| | | | |
|---|---|---|---|
| 3,682,249 A | 8/1972 | Fischer et al. | |
| 4,925,247 A * | 5/1990 | Hjelmstad | 299/5 |
| 6,309,431 B1 | 10/2001 | Becker et al. | |
| 6,364,018 B1 | 4/2002 | Brannon et al. | |
| 6,896,926 B2 | 5/2005 | Qiu et al. | |
| 7,032,664 B2 | 4/2006 | Lord et al. | |
| 7,115,546 B2 | 10/2006 | Qu et al. | |
| 7,144,844 B2 | 12/2006 | Qu et al. | |
| 7,493,955 B2 | 2/2009 | Gupta et al. | |
| 7,507,469 B2 | 3/2009 | Mao et al. | |
| 7,931,089 B2 | 4/2011 | Miller et al. | |
| 2004/0110877 A1 | 6/2004 | Becker | |
| 2007/0114030 A1 | 5/2007 | Todd et al. | |
| 2008/0011477 A1 | 1/2008 | Rediger et al. | |
| 2010/0019456 A1 | 1/2010 | Gerrard | |
| 2011/0077176 A1 | 3/2011 | Smith et al. | |
| 2011/0105367 A1 | 5/2011 | Bicerano et al. | |
| 2011/0118155 A1 | 5/2011 | Pisklak et al. | |
| 2014/0060832 A1 * | 3/2014 | Mahoney et al. | 166/280.2 |

OTHER PUBLICATIONS

Lu et al., "Magnetic Switch of Permeability for Polyelectrolyte Microcapsules Embedded with Co@Au Nanoparticles", American Chemical Society, Langmuir 2005, 21, 2042-2050.
Yang, Y.-J et al.; "Mesoporous Silica Nanotubes Coated with Multilayered Polyelectrolytes for pH-Controlled Drug Release"; Acta Biomaterialia 2010, 6(8) 3092-3100.
Sukhorukov, G.B. et al; "Layer-by-Layer Self Assembly of Polyelectrolytes on Colloidal Particles"; Colloids and Surfaces A; Physicochemical and Engineering Aspects; 1988; 137(-13), 253-286.
N. Pargaonkar et al.; "Controlled Release of Dexamethasone from Microcapsules Produced by Polyelectrolyte Layer-by-Layer Nanoassembly"; Pharmaceutical Research, 2005, 22, 826-835.

* cited by examiner

*Primary Examiner* — Zakiya W Bates
(74) *Attorney, Agent, or Firm* — John Wilson Jones; Jones & Smith, LLP (57) ABSTRACT

Well treatment particulates are coated with polyionic material and a composite is formed comprising multiple layers of polyelectrolyte, each layer composed of polyionic material counter to the polyionic material of the polyelectrolyte layer to which it is adjacent.

21 Claims, 2 Drawing Sheets

METHOD OF REDUCING DUST WITH SELF-ASSEMBLY COMPOSITES

This application is a continuation-in-part application of U.S. patent application Ser. No. 13/283,405, filed on Oct. 27, 2011.

FIELD OF THE INVENTION

The present invention relates to well treatment composites having a particulate substrate and a multiple of polyelectrolyte layers applied onto the substrate and methods of using such well treatment composites in treatment operations including hydraulic fracturing and gravel packing. The invention further relates to methods of reducing dust during transport and well treatment operations using such well treatment composites.

BACKGROUND OF THE INVENTION

Hydraulic fracturing is a common stimulation technique used to enhance production of hydrocarbon fluids and gas from subterranean formations. In a typical hydraulic fracturing treatment, a fracturing fluid containing solid proppants is injected into the wellbore at pressures sufficient to create or enlarge a fracture in the reservoir. The proppant is deposited in the fracture and serves to hold the fracture open, thereby enhancing the ability of hydrocarbons to migrate from the formation to the wellbore through the fracture. Because well productivity depends on the ability of a fracture to conduct hydrocarbons from the formation to the wellbore, fracture conductivity is an important parameter in determining the degree of success of a hydraulic fracturing treatment.

The creation of reservoir "fines" during hydraulic fracturing has been reported to create problems. Most notably, fines are instrumental in reducing fracture conductivity. When proppant materials are subjected to reservoir closure stresses and are compressed together, fines are generated. Production of fines in the reservoir also often results in a reduction in reservoir permeability due to plugging of pore throats by the fines in the reservoir matrix.

Since the degree of stimulation afforded by the fracture treatment is dependent upon the propped width, it is important that the proppant exhibit resistance to crushing from the high stresses in the well. Improvements have been continuously sought to control and prevent the crushing of proppants at in-situ reservoir conditions. For instance, resin-coated proppant materials have been designed to help form a consolidated and permeable fracture pack when placed in the formation wherein the resin coating enhances the crush resistance of the proppant. The coating may further act as a tackifying agent to control fines from migrating into the proppant pack. The coating may be applied to the proppant by mixing proppant particulates with a resinous system and hardening the resin in-situ. Alternatively, a pre-coated proppant may be pumped into the formation with the fracturing fluid. Further, the proppant may be pumped into the formation and then consolidated with a curing solution which is pumped after the proppant material is in place.

Fines may further migrate during gravel packing Gravel packing is a sand-control method employed to prevent the production of formation sand. Gravel packing treatments are used to reduce the migration of unconsolidated formation particulates into the wellbore. Typically, gravel pack operations involve placing a gravel pack screen in the wellbore and packing the surrounding annulus between the screen and the wellbore with gravel designed to prevent the passage of formation sands through the pack. The gravel pack screen is generally a type of filter assembly used to support and retain the gravel placed during the gravel pack operation. Particulates known in the art as gravel are carried to a wellbore by a hydrocarbon or water carrier fluid. The carrier fluid leaks off into the subterranean zone and/or is returned to the surface while the particulates are left in the zone. The resultant gravel pack acts as a filter to separate formation sands from produced fluids while permitting the produced fluids to flow into the wellbore.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

To minimize the migration of formation fines, coated and/or uncoated particulates have further been used in gravel packing. While the use of resin coated proppants has been successful in minimizing the generation of fines during hydraulic fracturing and fine migration during gravel packing, such materials are known to erode oil and gas production equipment. There is an ongoing need to develop particulates exhibiting crush resistance that can be used as proppants and gravel for minimizing fines generation and fines migration, reduce proppant pack and gravel pack damage, and which are less eroding to oil and gas production equipment.

In addition to concerns arising from the creation of fines, the use of certain particulates used as proppants during hydraulic fracturing and sand control particulates have presented other challenges. One such concern is presented by the release of dust from those particulates carrying a positive or negative charge. For instance, with certain proppants, such as sand, dust is released during transport of the proppant as well as during usage of the proppant within the well. Recently, the release of dust from fracturing operations has come under close scrutiny as health concerns upon field workers and those within residential areas within the vicinity of on-shore fracturing has risen. There has not been a method developed to date which is specifically designed to reduce the release of dust from proppants. While resin coating of frac sand has been noted to decrease dust production, the addition of a resin coating doubles the cost of frac sand. In addition, the chemicals used to make the resins are not environmentally friendly. Lastly, the application of resin coating to frac sand requires the sand to be heated either by electricity or the burning of natural gas, both of which are costly. Alternative methods for reducing the generation of dust from charged particulates have thus been sought.

SUMMARY OF THE INVENTION

The invention relates to a well treatment particulate having a positive or negative charge onto which is formed two or more polyelectrolyte layers.

The particulate may be a proppant or a sand control particulate and the coated particulate containing the polyelectrolyte layers may be used in hydraulic fracturing or a sand control operation of a subterranean formation penetrated by a wellbore. The presence of the polyelectrolyte layers may reduce the production of fines from the particulate during a well treatment operation or during transport of the particulate. The presence of the polyelectrolyte layers on the particulate may further reduce wear in pumping components and downhole tools, completion tubing and casing, and related hardware during operations.

The invention further relates to a well treatment fluid containing the well treatment particulate coated with the polyelectrolyte layers. In addition, the invention relates to a method of making the coated particulates and a method of using the coated particulates in the treatment of a well.

In one aspect, the particulate substrate may be composed of quartz, sand, glass beads, plastics, aluminum pellets, ceramics (including porous ceramics) and polymeric materials. The particulate substrate may have a positive charge or a negative charge.

In one preferred aspect, the polyelectrolyte layers may be simultaneously applied onto a charged particulate substrate.

In an embodiment, the well treatment particulate is a charged particulate substrate and the polyelectrolyte layers are formed onto the charged particulate substrate. Each of the polyelectrolyte layers is composed of one or more distinct polyionic materials. The polyionic materials of adjacent polyelectrolyte layers are oppositely charged.

The presence of the two or more polyelectrolyte layers on the charged particulate substrate reduce the amount of dust generated from the charged particulate substrate. Thus, when the charged particulate substrate is to be used as a proppant or sand control particulate, the presence of the two or more polyelectrolyte layers reduce the amount of dust generated during pumping of the proppant or sand control particulate into the well and/or formation.

In another embodiment, the presence of the two or more polyelectrolyte layers reduces the amount of dust generated by the particulate substrate during transport of the particulate to the wellbore.

In an aspect, the particulate substrate is combined with two or more polyelectrolyte multi-layers to form a well treatment composite. The multi-layers may be a bilayer, trilayer, etc. For example, a well treatment composite may be composed of more than one polyelectrolyte bilayer coated onto the particulate substrate such that a second polyelectrolyte bilayer is coated onto the first polyelectrolyte bilayer (the polyelectrolyte bilayer adjacent to the particulate substrate). A third polyelectrolyte bilayer may be coated onto the second polyelectrolyte bilayer, a fourth polyelectrolyte bilayer may be coated onto the third polyelectrolyte bilayer and so on. Each polyelectrolyte bilayer contains a bottom layer and a top layer which contain polyionic material. The polyionic material of the bottom layer and the polyionic material in the top layer are oppositely charged (counterions). The bottom layer of each polyelectrolyte layer contains polyionic material which has a charge which is opposite to the charge of the polyionic materials in the top layer of the polyelectrolyte bilayer which is adjacent to it. For example, where the particulate substrate is coated with three polyelectrolyte bilayers then the polyionic material of the bottom layer of third polyelectrolyte bilayer has a charge which is opposite to the charge of the polyionic material of the top layer of the second polyelectrolyte bilayer and the polyionic material of the bottom layer of the fourth polyelectrolyte bilayer has a charge which is opposite to the charge of the polyionic material of the top layer of the third polyelectrolyte bilayer.

In another aspect, the particulate substrate contains a charge (for instance, where the particulate surface has been surface modified). In this instant, the polyionic material of the bottom layer of a polyelectrolyte multi-layer coated onto the particulate substrate (a first polyelectrolyte bilayer) has a charge which is the opposite to the charge on the surface of the particulate substrate. The polyionic material of the top layer of the first polyelectrolyte bilayer is a counterion to the polyionic material of the bottom layer of the polyelectrolyte bilayer.

In another aspect, where the polyionic material of the bottom layer of the first polyelectrolyte multi-layer (e.g., a bilayer) is positively charged and the polyionic material of the top layer of the first polyelectrolyte bilayer is negatively charged, a second top layer may be added to the polyelectrolyte bilayer such that the most distant layer from the particulate substrate is positively charged. In an exemplary aspect, where the particulate substrate contains a negative charge, the first polyelectrolyte bilayer may be composed of three layers, each containing a polyionic material wherein such layers consist of the bottom layer (adjacent to the particulate substrate), a first top layer and a second top layer.

Including nanoparticles into one or more of the polyionic materials may improve the performance of the well treatment composite. For example, the crush strength of a proppant may increase with the addition of nanoparticles. Thus, nanoparticles may be included into the polyionic solutions so they are deposited with the polyionic materials. The nanoparticles may also be included through a layer by layer approach, wherein the polymer and the nanoparticles are separately and alternatively applied.

In an aspect, the nanoparticles may have a surface charge. This permits the nanoparticles to be deposited with and to be bound to the polyionic materials. Thus, the surface charge of the nanoparticles may be the same charge as the polyionic material in the polyionic coating being applied. In an aspect, the nanoparticle may be clay (such as bentonite and smectite clays), double layered hydroxides, carbon nanotubes, graphene oxide, metal phosphates (such as zirconium and titanium phosphate), metal sulfides (such as $WS_2$, $TaS_2$, $TiS_2$), or metal oxides (such as alumina, silica, magnesium oxide, or zinc oxide.) The surface of the nanoparticles can be charged or not charged.

In an aspect, two or more polyelectrolyte layers may be formed onto a particulate substrate by simply mixing two or more polyionic materials together in water and then applying the mixture onto the substrate wherein the ion of one of the polyionic materials is counter to the ion of the other polyionic material. Polyionic layers are formed onto the substrate by the polyionic material self-aligning or self-assembling onto the particulate.

In another aspect, the well treatment composite is prepared by first contacting the particulate substrate with a first coating solution which contains the polyionic material of the first polyelectrolyte multi-layer (e.g., bilayer). The polyionic material of the first coating solution is non-covalently bonded to the particulate substrate. In a preferred embodiment, prior to contacting the first coating solution the particulate substrate is not subjected to surface modification. The coated particulate substrate is subsequently removed after a layer of the polyionic material has formed on its surface. The particulate substrate may then be exposed to another solution of polyionic material, having the opposite charge of the polyionic material of the first solution, thereby depositing a second layer of polyionic material onto the surface of the particulate substrate. The polyelectrolyte bilayer is thus formed on the particulate substrate. Successive layers of polyionic material may be coated onto the polyelectrolyte bilayer via layer-by-layer deposition of the polyionic materials. Any suitable deposition techniques can be used in the layer-by-layer coating. Exemplary deposition techniques include, without limitation, dipping a substrate into a coating solution and spraying a substrate with a coating solution. There are many types of industrial coating processes, all of which may be used to deposit the polyionic material. In an aspect, dip coating, spin coating, or spray coating may be used.

The layers of polyionic material bind to the surface of the particulate substrate and to one another substantially through electrostatic forces. The process may be repeated many times depositing polyionic materials layer-by-layer until an effective coating on the particulate substrate has formed.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Illustrative embodiments of the invention are described below as they might be employed in the operation and in the treatment of oilfield applications. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

The well treatment composites defined are prepared by at least partially coating a particulate substrate.

Generally, the particulate substrate may be deformable or non-deformable and may be non-porous or porous and may be inorganic or organic in nature. In a preferred embodiment, the particulate substrate is non-deformable and is composed of quartz, sand, glass beads, plastics, aluminum pellets, ceramics (including porous ceramics) or a polymeric material.

The particulate substrate may also be a deformable particulate (particulates that yield upon application of a minimum threshold level to point to point stress) include naturally occurring materials, such as (a) chipped, ground or crushed shells of nuts such as walnut, pecan, coconut, almond, ivory nut, brazil nut, etc.; (b) chipped, ground or crushed seed shells (including fruit pits) of seeds of fruits such as plum, olive, peach, cherry, apricot, etc.; (c) chipped, ground or crushed seed shells of other plants such as maize (e.g., corn cobs or corn kernels), etc.; and (d) processed wood materials such as those derived from woods such as oak, hickory, walnut, poplar, mahogany, etc. Deformable particulates may further include such copolymers as polystyrene divinylbenzene terpolymers (including polystyrene/divinyl benzene) and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane and mixtures thereof.

Suitable particulate substrates include those relatively lightweight particulates having an apparent specific gravity (ASG) (API RP 60) less than 2.65. For instance, the relatively lightweight particulates are ultra lightweight (ULW) having an ASG less than or equal to 2.45. Even more preferred are those ULW particulates having an ASG less than or equal to 2.25, preferably less than or equal to 2.0, more preferably less than or equal to 1.75, even more preferably less than or equal to 1.5, most preferably less than or equal to 1.25.

The particulate substrate is coated with two or more layers of polyelectrolyte, each layer comprising polyionic material. The polyionic material in each polyelectrolyte layer has a like charge and may be composed of the same ionic material or multiple ionic materials. Thus, for example, a polyelectrolyte layer may contain positive charged polyionic material, the polyionic material being a mixture of positively charged species.

The polyionic material used in the well treatment composite refers to a charged polymer that has a plurality of charged groups in a solution, or a mixture of charged polymers each of which has a plurality of charged groups in a solution. Exemplary charged polymers include polyelectrolytes. Polyionic materials include both polycationic (having positive charges) and polyanionic (having negative charges) polymeric materials.

The polyionic materials that may be employed in the present invention include polyanionic and polycationic polymers. Examples of suitable polyanionic polymers include, for example, a synthetic polymer, a biopolymer or modified biopolymer comprising carboxy, sulfo, sulfato, phosphono or phosphate groups or a mixture thereof, or a salt thereof.

Examples of synthetic polyanionic polymers are: a linear polyacrylic acid (PAA), a branched polyacrylic acid, a polymethacrylic acid (PMA), a polyacrylic acid or polymethacrylic acid copolymer, a maleic or fumaric acid copolymer, a poly(styrenesulfonic acid) (PSS), a polyamido acid, a carboxy-terminated polymer of a diamine and a di- or polycarboxylic acid, a poly(2-acrylamido-2-methylpropanesulfonic acid) (poly-(AMPS)), an alkylene polyphosphate, an alkylene polyphosphonate, a carbohydrate polyphosphate or carbohydrate polyphosphonate (e.g., a teichoic acid). Examples of a copolymer of acrylic or methacrylic acid include a copolymerization product of an acrylic or methacrylic acid with a vinyl monomer including, for example, acrylamide, N,N-dimethyl acrylamide or N-vinylpyrrolidone. Examples of polyanionic biopolymers or modified biopolymers are: hyaluronic acid, glycosaminoglycanes such as heparin or chondroitin sulfate, fucoidan, poly-aspartic acid, poly-glutamic acid, carboxymethyl cellulose, carboxymethyl dextrans, alginates, pectins, gellan, carboxyalkyl chitins, carboxymethyl chitosans, sulfated polysaccharides.

A preferred polyanionic polymer is a linear or branched polyacrylic acid or an acrylic acid copolymer. Another preferred anionic polymer is a linear or branched polyacrylic acid. A branched polyacrylic acid in this context is to be understood as meaning a polyacrylic acid obtainable by polymerizing acrylic acid in the presence of suitable amounts of a di- or polyvinyl compound.

The most preferred polyanionic polymer is poly(sodium styrene sulfonate).

A suitable polycationic polymer is, for example, a synthetic polymer, biopolymer or modified biopolymer comprising primary, secondary, or tertiary amines or quaternary ammonium groups or a suitable salt thereof, for example a hydrohalide such as a hydrochloride thereof, in the backbone or as substituents. Polycationic polymers comprising primary or secondary amino groups or a salt thereof are preferred.

Examples of synthetic polycationic polymers are:

(i) a polyallylamine hydrochloride (PAH) homo- or copolymer, optionally comprising modifier units;

(ii) a polyethyleneimine (PEI);

(iii) a polyvinylamine homo- or copolymer, optionally comprising modifier units;

(iv) a poly[vinylbenzyl-tri($C_1$-$C_4$ alkyl)ammonium salt], for example poly(vinylbenzyl-trimethylammonium chloride);

(v) a polymer resulting from a step-wise polymerization (quaternization) reaction between a dihalide and N,N,N',N'-tetra($C_1$-$C_4$ alkyl)-alkylenediamine, for example a polymer from (a) propylene-1,3-dichloride or -dibromide or o-, m-, or p-xylylene dichloride or dibromide and (b) N,N,N',N'-tetramethyl-1,4-tetramethylenediamine;

(vi) a poly(vinylpyridine) or poly(vinylpyridinium salt) homo- or copolymer;

(vii) a polymer via ring-forming polymerization of N,N-diallyl-N,N-di(C1-C4 alkyl)ammonium halide, comprising units of the formula:

wherein $R_1$ and $R_2$ are each independently $C_1$-$C_4$ alkyl, in particular methyl, and An is an anion, for example, a halide anion such as the chloride anion;

(viii) a homo- or copolymer of a quaternized di($C_1$-$C_4$ alkyl)aminoethyl acrylate or methacrylate, for example a poly[2-hydroxy-3-methacryloylpropyltri($C_1$-$C_2$ alkyl) ammonium salt]homopolymer, such as poly(2-hydroxy-3-methacryloylpropyltrimethylammonium chloride), or a quaternized poly(2-dimethylaminoethyl methacrylate or a quaternized poly(vinylpyrrolidone-co-2-dimethylaminoethyl methacrylate); or

(ix) a polyaminoamide (PAMAM), for example a linear PAMAM or a PAMAM dendrimer.

The above mentioned polymers comprise in each case the free amine, a suitable salt thereof, as well as any quaternized form, if not specified otherwise.

The most preferred polycationic polymer is poly(diallydimethyl)amine hydrochloride).

Suitable comonomers optionally incorporated in the polymers according to (i), (iii), (vi) or (viii) above are, for example, hydrophilic monomers such as acrylamide, methacrylamide, N,N-dimethyl acrylamide, N-vinylpyrrolidone and the like.

Suitable modifier units of the polyallylamine (i) are known and comprise, for example, units of formula:

wherein X is $C_1$-$C_6$ alkyl, which is substituted by two or more of the same or different substituents selected from the group consisting of hydroxy, $C_1$-$C_5$ alkanoyloxy, and $C_1$-$C_5$ alkylaminocarbonyloxy.

Preferred substituents of the alkyl radical X are hydroxy, acetyloxy, propionyloxy, methyl-aminocarbonyloxy or ethylaminocarbonyloxy, especially hydroxy, acetyloxy or propionyloxy and in particular hydroxy. X is preferably linear $C_3$-$C_6$ alkyl, more preferably linear $C_4$-$C_5$ alkyl, and most preferably n-pentyl, which is in each case substituted as defined above. A particularly preferred radical X is 1,2,3,4,5-pentahydroxy-n-pentyl.

It may be preferred to use a charged particulate substrate (such as a silicon containing substrate) or modify the surface of the particulate substrate to provide a charged substrate surface in order to enhance electrostatic bonding between the particulate substrate and the polyionic layer most adjacent to the particulate substrate. For instance, the particulate substrate may be a neutral particulate whose surface has been modified to carry a positive or negative charge prior to application of the first polyionic layer. For instance, where the substrate is a metal oxide, the charge of the metal oxide may be modified by titrating the oxide with dilute HC1 or dilute sodium hydroxide, depending on the charge of the substrate which is desired. Thus, the charged substrate surface may be silica or silicon wafer. Surface modification may thus charge the surface of the particulate substrate such that the polyionic materials of the bottom layer of the first polyelectrolyte bilayer deposited onto the particulate substrate may more easily bind to the substrate. For instance, when the particulate substrate is sand, the surface of the sand may be silylated in order to attract the charge of polyionic material of the bottom layer of the first polyelectrolyte bilayer, i.e., the polyionic material adjacent to the particulate substrate. While it is more preferred to use a negative charge particulate substrate, the particulate substrate may bear a positive charge as well. For instance, when the particulate substrate is ceramic, the surface of the ceramic may be hydroxylated in order to counter the charge of the polyionic material of the polyelectrolyte bilayer adjacent to the charged ceramic.

Polyelectrolyte layers may be formed on the substrate of the particulate wherein polyionic material of like charges aggregate into discrete layers onto the substrate of the particulate. Thus, for example, a polyelectrolyte layer of positive charged polyionic material may be adjacent to a negative charged particulate substrate. A polyelectrolyte layer of negative charged polyionic material may be adjacent to the polyelectrolyte layer of positive charged polyionic material which is adjacent to the particulate substrate. A succession of polyelectrolyte layers each comprised of polyionic material having counterions to the polyionic material of its adjacent polyelectrolyte may be formed. The number of polyionic layers on the particulate substrate may be as high as 1,000 though usually is less than 40 and typically is between 2 and 20.

Thus, where the substrate is charged, the polyionic material of the polyelectrolyte layer ("the first polyelectrolyte layer") immediately adjacent to the charged particulate substrate may have a charge counter to or opposite to that of the charge of the particulate substrate. The polyelectrolyte layer adjacent to the first polyelectrolyte layer (the "second polyelectrolyte layer") may have a charge counter to or opposite to that of the charge of the polyionic material of the first polyelectrolyte layer. The charge of the polyionic layer of the polyelectrolyte layer adjacent to the second polyelectrolyte layer ("the third polyelectrolyte layer") has a charge counter to or opposite to that of the charge of the polyionic material of the second polyelectrolyte layer, and so on.

In one embodiment, alternating polyelectrolyte layers composed of oppositely charged polyionic material are formed onto a charged particulate substrate by simultaneously depositing onto the substrate polyionic material of opposite charges. The polyionic materials self-assemble onto the charged particulate substrate much like oppositely charge magnets assemble with each other. Clusters of polyelectrolyte layers may be formed onto the particulate substrate or more discrete polyelectrolyte layers may form onto the particulate. In one embodiment, polyelectrolyte layers having oppositely charged polyionic material may interlock with each other. This arrangement may strengthen the coating forming onto the particulate.

Thus, polyionic materials of like charge assemble to form the first polyelectrolyte layer, wherein the charge of the polyionic materials is counter to the charge of the charged particulate substrate. The polyionic materials of like charge (opposite to the charge of the polyionic materials of the first polyelectrolyte layer) self-assemble to form the second polyelectrolyte layer, and so on.

The coating of multiple polyelectrolyte layers comprising polyionic materials onto a charged particulate substrate has been found to markedly reduce the generation of dust as well as the release of dust from the substrate upon agitation of the particulates. Thus, coating of the particulate substrate with multiple polyelectrolyte layers is especially helpful in the reduction in generation of dust during transport of the well treatment particulates (such as a proppant or sand control particulate) as well during pumping of the well treatment particulates into a well and/or into the formation.

The presence of the polyelectrolyte layers on the particulate substrate has also been found to reduce the production of fines from the particulate during a well treatment operation as well as during transport of the particulate. The presence of the polyelectrolyte layers on the particulate may further reduce wear in pumping components and downhole tools, completion tubing and casing, and related hardware during operations.

While in a preferred embodiment, the entire surface of the particulate substrate is coated with polyelectrolyte layers, a portion of the surface of the particulate substrate may be coated as well. For instance, between from about 5 to about 100 percent of the surface of the well treatment particulate may be coated with the polyelectrolyte layer. In one embodiment, thereof less than or equal to 25 percent of the surface of the well treatment particulate may be coated with the polyelectrolyte layer. In another embodiment, less than or equal to 50 percent of the surface of the well treatment particulate may be coated with the polyelectrolyte layer. In another embodiment, less than or equal to 75 percent of the surface of the particulate may be coated with the polyelectrolyte layer. Further, all or a portion of a polyelectrolyte layer may be coated onto an adjacent oppositely charged polyelectrolyte layer.

In an embodiment, a polyelectrolyte layer may be coated onto the particulate in the form of multi-layers of oppositely charged like charged layers, each layer comprising counterions to the polyionic material of the polyelectrolyte layer which is adjacent to it, i.e., the polyionic material in a layer has charge opposite to the charge of the polyionic material as its adjacent layer(s). For purposes herein, the innermost layer to the particulate substrate, i.e., the layer immediately adjacent to the particulate substrate, shall be termed "the bottom layer". The top layer is composed of polyionic material which is counterions to the polyionic material in the bottom layer. The bottom layer and the top layer constitute the polyelectrolyte bilayer. When more than two layers constitute the polyelectrolyte then each layer between the bottom layer and the top layer has a charge opposite to the layer to which it is adjacent.

In a preferred embodiment, the polyelectrolyte is a bi-layer and one or more polyelectrolyte bilayers are coated onto the particulate substrate. Each successive polyelectrolyte bilayer would be coated onto the first polyelectrolyte layer which is adjacent to the particulate substrate. Each additional polyelectrolyte bilayer consists of a bottom layer composed of a polyionic material and a top layer composed of a second polyionic material wherein the polyionic material in the bottom layers and top layers are oppositely charged.

Each polyelectrolyte multi-layer is laid onto the particulate substrate in succession such as in a self-assembly. The polyionic material in the bottom layer of each successive polyelectrolyte multi-layer has a charge which is opposite to the charge of the polyionic material in the top layer to which the successive polyelectrolyte multi-layer is adjacent.

For example, where three polyelectrolyte bilayers are coated onto the particulate substrate, the polyionic material in the bottom layer of the third polyelectrolyte bilayer is opposite to the charge of the polyionic material in the top layer of the second polyelectrolyte bilayer. In those instances where four polyelectrolyte bilayers are coated onto the particulate substrate, the charge of the polyionic material in the bottom polyionic layer of the fourth polyelectrolyte bilayer is opposite to the charge of the polyionic material of the top layer of the third polyelectrolyte bilayer and so on.

When the particulate substrate contains charged materials, it is necessary that the polyionic material of the bottom layer of the first polyelectrolyte bilayer coated onto the particulate substrate have a charge which is the opposite to the charge of the particulate substrate. The polyionic material of the top layer of the first polyelectrolyte bilayer is a counterion to the polyionic material of the bottom layer.

In some instances, the polyionic material of the bottom layer of the first polyelectrolyte bilayer may be positively charged. This would be the case, for example, where the particulate substrate carries a negative charge. The polyionic material of the top layer of the first polyelectrolyte bilayer would thus carry a negative charge. In such instances, it may be desirable to apply a second top layer, i.e., a second coating on top of the first top coating, such that the polyionic material of the second top coating is oppositely charged to the polyionic material of the first top coating. The second top layer is often desirable in order to seal or embed the negatively charged polyionic material of the first top coating within the matrix defined by the first top layer and the bottom layer of the first polyelectrolyte layer. Thus, for instance, where the particulate substrate is negatively charged, the bottom layer may be composed of positively charged polyionic material, the first top layer may be composed of negatively charged polyionic material and the second top layer would then be composed of positively charged polyionic material. The polyionic material of the bottom layer of a second polyelectrolyte bilayer, when present, would be of a negative charge.

It is often preferred to include nanoparticles in the polyionic solutions in order improve the performance of the deposited coating. Alternatively, the electrolyte layers and the nanoparticles may be applied separately onto the substrate as alternating layers.

Since the nanoparticles are deposited along with the polyionic material onto the particulate substrate, it is desirable that they have a surface charge allowing them to be deposited with and to bind to the polyionic materials. Any type of nanoparticle that has a surface charge capable of binding with the depositing polyelectrolytes may be used in accord with the principles of the invention. In an aspect, the nanoparticle may be a clay (such as bentonite and smectite clays), double layered hydroxides, carbon nanotubes, graphene oxide, metal phosphates (such as zirconium and titanium phosphate), metal sulfides (such as $WS_2$, $TaS_2$, $TiS_2$), metal oxides (such as alumina, silica, magnesium oxide, or zinc oxide.) When present, the amount of nanoparticles included in the polyionic solution may be between from about 0.01 to about 15, preferably from about 0.05 to about 10, volume percent.

The composite of coated multi layers of polyelectrolyte onto the particulate substrate may be prepared by merely mixing two or more polyionic materials of opposite charges together in water. The aqueous mixture may then be deposited onto the particulate substrate and the composite, then dried. During the process, polyelectrolytes of opposite charges aggregate with each other. All or a portion of the surface of the particulate substrate may be covered by a polyelectrolyte layer having polyionic materials of a charge counter to the charge of the surface of the substrate. All or a portion of the surface of the polyelectrolyte layer adjacent to the particulate substrate may be covered by a second polyelectrolyte layer having a charge opposite to the charge of the polyelectrolyte adjacent to the particulate substrate. A succession of polyelectrolyte layers containing polyionic materials may be deposited onto the composite, each successive polyelectrolyte layer comprising polyionic materials having a charge opposite to the charge of the polyionic material of the polyelectrolyte layer adjacent to it.

Typically, the thickness of any polyelectrolyte layer will be less than about 50 nm, more typically less about 25 nm. Normally, between from about 25 to 80 percent of the surface of the particulate substrate is coated with the polyelectrolyte layer and between from about 25 to 80 percent of each polyelectrolyte surface is coated with a successively applied polyelectrolyte coating. In an embodiment, it is desirable to coat the particulate substrate with an amount of polyelectrolyte layer such that all of the charges on the substrate will be countered with a charge from the oppositely charged polyionic material of the polyelectrolyte layer which is being applied. Likewise, the amount of a successive polyelectrolyte layer applied to an adjacent polyelectrolyte layer is the amount to counter the charges of the polyionic material to which the successive polyelectrolyte layer is being applied. As such, a 1:1 ratio of negative to positive charges is preferred.

The well treatment composite may further be prepared by a "layer-by-layer" methodology wherein each layer of a material is non-covalently bond to another layer of a different material.

For instance, the well treatment composite may be prepared by first contacting the particulate substrate with a first coating solution which contains the polyionic material of the bottom layer in order to non-covalently apply the innermost layer of the polyionic material onto the substrate. Typically, the amount of polyionic material in a coating solution as defined herein is between from about 0.02 to about 2 percent by weight, typically between from about 0.05 to about 0.1 percent by weight.

The particulate substrate having the innermost layer of the polyionic material attached to its surface is then contacted with a second coating solution containing the polyionic material comprising the top layer. The combination of the two layers of polyionic material forms a first polyelectrolyte bilayer on top of the particulate substrate; the first polyelectrolyte bilayer consisting of the bottom or innermost layer to the particulate substrate composed of a first polyionic material and a top layer of a polyionic material on top of the innermost layer; the second polyionic material having charges opposite of the charges of the first polyionic material. Additional layers may then be added to the substrate by further incorporating steps of contacting the substrate having the first polyelectrolyte bilayer with a third coating solution. The third coating solution contains a third polyionic material having a charge which is opposite to the charge of the second polyionic material. The third polyionic material may be the same as the first polyionic material or may be another polyionic material with the same charge as the first polyionic material. The third polyionic layer is thus formed on top of the first polyelectrolyte bilayer. A fourth polyionic coating may then be applied onto the third polyionic layer on the substrate in order to form a second polyelectrolyte bilayer composed of the third polyionic material and the fourth polyionic material. The fourth polyionic material has a charge opposite to the charge of the third polyionic material. The fourth polyionic material may be composed of the same material as the second polyionic material or may be another polyionic material with the same charge as the second polyionic material. The method may then be repeated in a like manner to form one or more additional polyelectrolyte bilayers.

One or more rinsing steps may be included during the process of making the composite, especially between steps of applying successive polyionic coating layers containing polyionic materials of unlike charges. The rinsing steps are carried out by contacting the particulate substrate with a rinsing solution. The rinsing solution may be an aqueous solution.

To effectively deposit the first layer of polyionic material, the surface of the particulate substrate may need to be charged making it capable of having electrostatic interactions with the polyionic material. For a proppant such as sand this step may be unnecessary. Sand is largely composed of silica ($SiO_2$), which has Si—$O^-$ groups or Si—OH groups that readily hydrolyze, found along its surface. These Si—$O^-$ groups allow for the first layer polyelectrolyte to bind. Other types of proppant may be neutrally charged at their surface and, hence, not capable forming a substantial electrostatic interaction to bind with the first polyelectrolyte layer. These proppants would have to undergo an initial step to place a charge on their surface. Any method that places a charge on the proppant surface allowing it to interact with the first polyelectrolyte layer is in accord with the principles of the present invention. For example, a proppant may need to undergo a silylation reaction placing Si—OH groups along its surface.

In preferred embodiments, the particulate coating that eliminates sharp edges on the particulate and functions as a lubricant to materially reduce mechanical erosion of the pumping components. Ideally, the coated particulate will have a low friction factor and high impact resistance that renders it resistant to chipping and shattering.

The layers of polyionic material bind to the surface of the particulate substrate and to one another substantially through electrostatic forces.

The well treatment composites defined herein are particularly effective in hydraulic fracturing as well as sand control fluids such as water, salt brine, slickwater such as slick water fracture treatments, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

The well treatment composites may be mixed and pumped during any desired portion of a well treatment such as hydraulic fracturing treatment or sand control treatment and may be mixed in any desired concentration with a carrier fluid. Suitable carrier fluids may be used in combination with gelling agents, crosslinking agents, gel breakers, surfactants, foaming agents, demulsifiers, buffers, clay stabilizers, acids, or mixtures thereof.

The use of the well treatment composites as a proppant advantageously provides for substantially improved overall system performance in stimulation procedure, such as hydraulic fracturing applications, as well as other well treating applications such as sand control. When used in hydraulic fracturing, the well treatment composites may be injected into a subterranean formation in conjunction with a hydraulic fracturing treatment or other treatment at pressures sufficiently high enough to cause the formation or enlargement of fractures.

Other well treating applications may be near wellbore in nature (affecting near wellbore regions) and may be directed toward improving wellbore productivity and/or controlling the production of fracture proppant or formation sand. Particular examples include gravel packing and "frac-packs." Moreover, such particles may be employed alone as a fracture proppant/sand control particulate, or in mixtures in amounts and with types of fracture proppant/sand control materials, such as conventional fracture or sand control particulate.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the well treatment composites and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

As an alternative to use of a screen, the sand control method may use the well treatment composites in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins is so desired.

In addition to hydraulic fracturing and sand control, the well treatment composites defined herein may be used in the corrosion protection of equipment, erosion/abrasion resistance of surfaces, chemical reaction delay mechanisms and other areas where a protective coating is beneficial. The composite may also reduce wear in pumping components, such as pump heads, and downhole tools, completion tubing and casing, and related hardware during operations.

EXAMPLES

The following examples describe the preferred embodiments of the present invention. Other embodiments within the scope of the claims will be apparent to those skilled in the art from the consideration of the specification or practice of the invention disclosed herein. It is intended that the specification, together with the examples, be considered exemplary only, with the scope and spirit of the invention being indicated by the claims.

Example 1

To form the coating, the sand was placed in an aqueous solution of 0.5% poly(allylamine hydrochloride) and 0.1% sodium chloride. The solution was decanted and the sand was rinsed. The sand was then placed in an aqueous solution of 0.08% poly(sodium styrene sulfonate). The solution was then decanted and the coated sand was rinsed.

Example 2

Figure 1:
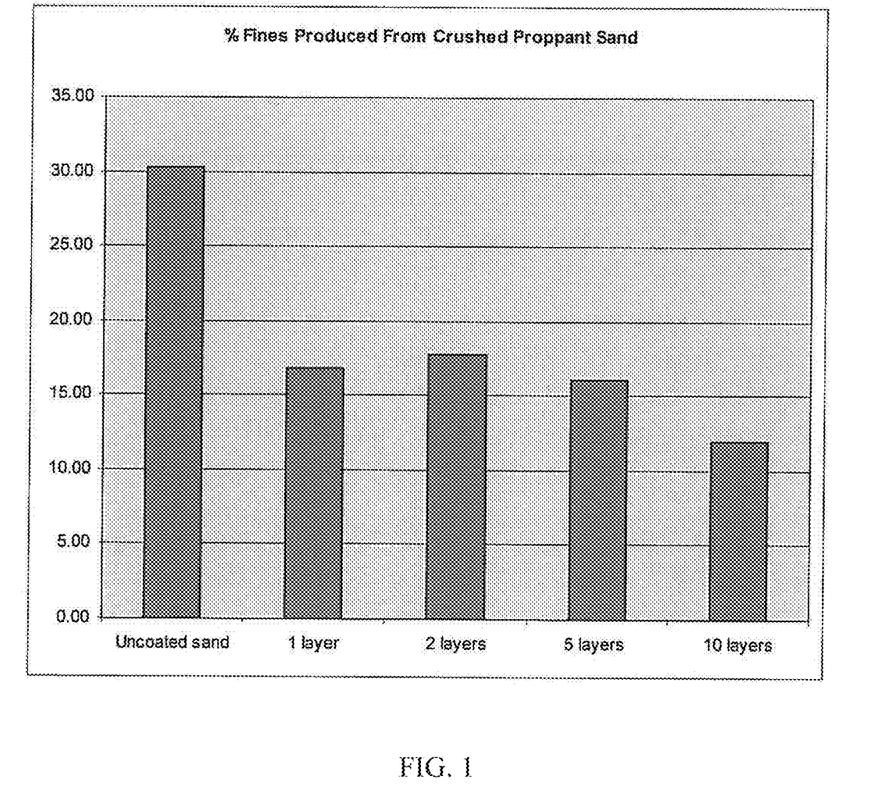
FIG. 1 illustrates the reduction in fines of uncoated sand particulates and composites of coated sand particulates defined by the invention after crushing for two minutes at 5550 pounds per square inch (psi).

To form the coating, the sand was placed in an aqueous solution of 0.5% poly(allylamine hydrochloride) and 0.1% sodium chloride. The solution was decanted and the sand was rinsed. The sand was then placed in an aqueous solution of 0.08% poly(sodium-4-styrene sulfonate) and 0.2% bentonite nanoclay. The solution was then decanted and the treated sand was then placed into an aqueous solution of 0.5% poly(allylamine hydrochloride) and 0.1% sodium chloride. The solution was then decanted and the coated sand was rinsed to form a polyelectrolyte bilayer (first polyelectrolyte bilayer) on the sand particulate. A second polyelectrolyte bilayer was further coated onto particulates coated with the first polyelectrolyte bilayer by placing such coated particulates in an aqueous solution of 0.08% poly(sodium-4-styrene sulfonate) and 0.2% bentonite nanoclay. The solution was then decanted and the treated sand was then placed into an aqueous solution of 0.5% poly(allylamine hydrochloride) and 0.1% sodium chloride. This process was repeated in succession to obtain a substrate particulate containing 5 and 10 polyelectrolyte bilayers. The composites were then subjected to crush for 2 minutes at 5,550 psi. The results are graphically displayed in FIG. 1. FIG. 1 illustrates that crush resistance of the particulate substrate was dramatically improved by coating of the particulate substrate with one or more polyelectrolyte bilayers. FIG. 1 shows that one polyelectrolyte bilayer reduces fines production by almost one half and that ten layers of polyelectrolyte bilayers reduce fines to almost one third as compared to uncoated sand.

Example 3

A self-assembling coating having alternating layers of positively-charged [poly(diallyldimethylammonium chloride)] and negatively-charged (sodium poly styrene sulfonate) on frac sand proppant was prepared from an aqueous-based system. Approximately 1 volume percent of each of the two water-soluble polymers were combined in distilled water. About 200 mL of the resulting aqueous solution was then mixed with 250 g of frac sand and shaken for two minutes. During this shaking the polymers self-assembled into positive and negative layers over the surface of the sand grains. When the aqueous solution was then drained from the sand the polymer coating remain adhered to individual grains. The water-polymer solution was shown to be reusable multiple times. As a control, 250 g of frac sand was also shaken with 200 mL of deionized water which did not contain any polymers but simply rinsed away dust particles. To mimic the rough handling responsible for producing dust during transport and pumping, multiple 15 gram samples of frac sand were tumbled in a roller drum for three days. Other samples of the sand were left unrolled for comparison. The ability of the polymer coating to reduce dust was tested by measuring the turbidity of water shaken with a known amount of frac sand. To test the dust release, a 15 g sample of sand was combined with 22 mL of deionized water, shaken one minute, and then allowed to sit undisturbed for one minute before measuring turbidity. The results are set forth in Table I.

TABLE I

| Sand Treatment | FAU Turbidity Measurements |
| --- | --- |
| Rolled, unrinsed sand | 231 |
| Rolled, rinsed, uncoated sand | 88 |
| Rolled, coated sand | 31 |
| Non-rolled, unrinsed sand | 212 |
| Non-rolled, rinsed, uncoated sand | 66 |

Figure 2:
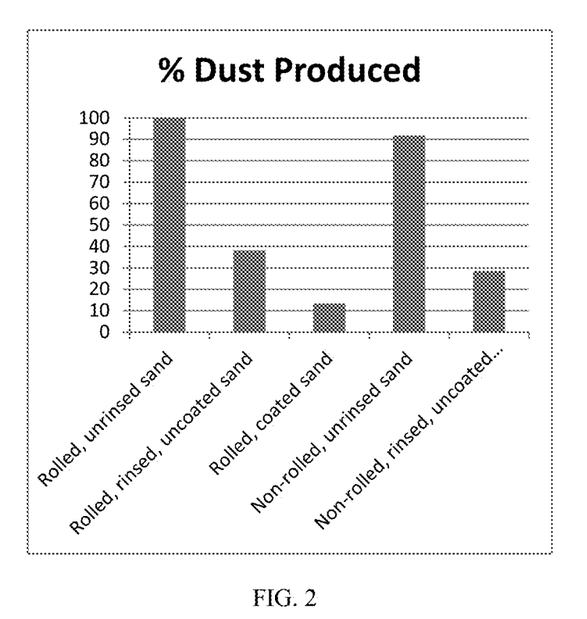
FIG. 2 illustrates the reduction in produced dust of uncoated sand particulates and composites of coated sand particulates defined by the invention.

As illustrated in Table I, unrinsed, uncoated, rolled sand had the highest turbidity measurement at 231 Formazin Attenuation Units (FAU). If the frac sand was rinsed once with deionized water before rolling, the turbidity measurement was reduced to 88 FAU. Frac sand coated with the self-assembling polymer layers had a turbidity of only 31 FAU after being rolled for three days. As illustrated in FIG. 2, this was an 87% reduction in dust released from the coated sand and a 65% reduction versus rinsed, uncoated sand. In comparison, non-rolled frac sand had a turbidity of 212 FAU if not rinsed and 66 FAU if rinsed once with deionized water. This corresponds to reduction in dust turbidity by the polymer-coated sand by 85% and 53% versus the non-rolled sands.

While the compositions and methods in accordance with the present invention have been described in terms of preferred embodiments, it will be apparent to those of skill in the art that variations can be applied to the compositions and/or methods and in the steps or in the sequence of steps described herein without departing from the concept, spirit and scope of the invention. Moreover, it will be apparent that certain agents that are chemically related can be substituted for the agents described herein while the same or similar results would be achieved. All such similar substitutes and modifications apparent to those skilled in the art are deemed to be within the scope and concept of the invention. It is intended that the specification be considered exemplary only, with the scope and spirit of the invention being indicated by the claims which follow.

The invention claimed is:

1. A method of reducing the amount of dust generated from a well treatment particulate during transport of the well treatment particulate or during pumping of the well treatment particulate into a well, the surface of the well treatment particulate having a positive or negative charge, the method comprising:

(a) forming onto at least a portion of the surface of the well treatment particulate at least two adjacent polyelectrolyte layers wherein the first polyelectrolyte layer adjacent to the surface of the well treatment particulate comprises a polyionic material and has a charge opposite to the charge of the surface of the well treatment particulate and further wherein the second polyelectrolyte layer adjacent to the first polyelectrolyte layer comprises a polyionic material having a charge opposite to the charge of the surface of the first polyelectrolyte layer; and (b) transporting the well treatment particulate or pumping into the well the well treatment particulate having a coating of the least two adjacent polyelectrolyte layers wherein the amount of dust generated during transport or pumping of the well treatment particulate containing the coating of the least two adjacent polyelectrolyte layers is less than the amount of dust generated during transport or pumping of the well treatment particulate not containing the coating of the least two adjacent polyelectrolyte layers.

2. The method of claim 1, wherein only a portion of the surface of the well treatment particulate is coated with the at least two polyelectrolyte layers.

3. The method of claim 1, wherein the well treatment particulate contains silicon.

4. The method of claim 3, wherein the well treatment particulate is sand.

5. The method of claim 1, wherein the polyionic material of one polyelectrolyte layer is poly(allylamine hydrochloride) and the polyionic material of another polyelectrolyte layer is poly(sodium styrene sulfonate).

6. The method of claim 1, wherein at least one of the polyionic materials is composed of nanoparticles.

7. The method of claim 6, wherein the nanoparticles are selected from the group consisting of bentonite clay, smectite clay, double layered hydroxides, carbon nanotubes, graphene oxide, metal phosphates, metal sulfides and metal oxides.

8. The method of claim 1, wherein the surface of the well treatment particulate, prior to coating of the first polyelectrolyte, has a positive charge.

9. The method of claim 1, wherein the charged well treatment particulate is prepared by modifying the surface of a neutral particulate to have a positive or negative charge.

10. The method of claim 1, wherein the generation of dust from the well treatment particulate is reduced during transport of the well treatment particulate.

11. The method of claim 1, wherein the generation of dust from the well treatment particulate is reduced during pumping of the well treatment particulate into the well.

12. The method of claim 1, wherein the entire surface of the well treatment particulate is coated with the at least two adjacent polyelectrolyte layers.

13. A method of reducing the generation of dust during transport of a charged well treatment particulate or during pumping of the charged well treatment particulate into a well, the method comprising:

(a) forming a composite by coating onto the surface of the well treatment particulate a succession of charged polyelectrolyte layers containing a polyionic material, wherein the succession of charged polyelectrolyte layers self-assemble such that the polyionic material of the polyelectrolyte layer adjacent to the well treatment particulate is the counterion to the charged well treatment particulate and the polyionic material of each polyelectrolyte layer is the counterion to the polyionic material of the adjacent polyelectrolyte layer; and (b) transporting the composite or pumping the composite into the well wherein the amount of dust generated from the well treatment particulate is reduced by the one or more polyelectrolyte layers self-assembled onto the well treatment particulate.

14. The method of claim 13, wherein the surface of the well treatment particulate is neutral and is modified, prior to forming the first polyelectrolyte layer onto the substrate, to have a positive or negative charge.

15. The method of claim 13, wherein the surface of the well treatment particulate is only partially coated with charged polyelectrolyte layers.

16. The method of 13, wherein the well treatment particulate contains silicon.

17. The method of claim 16, wherein the polyionic material of polyelectrolyte layers of like charges is the same material.

18. A method of reducing the amount of dust generated from a well treatment particulate during transport of the well treatment particulate or during pumping of the well treatment particulate into a well wherein the well treatment particulate has a charged surface and is a proppant or sand control particulate, the method comprising transporting or pumping the well treatment particulate as a composite formed by applying onto at least a portion of the surface of the well treatment particulate at least two adjacent polyelectrolyte layers wherein the first polyelectrolyte adjacent to the surface of the well treatment particulate comprises a polyionic material and has a charge opposite to the charge on the surface of the well treatment particulate and further wherein the second polyelectrolyte adjacent to the first polyelectrolyte comprises a polyionic material having a charge opposite to the charge of the first polyelectrolyte, wherein the amount of dust generated during transport or pumping of the well treatment particulate containing the at least two adjacent polyelectrolyte layers is less than the amount of dust generated during transport or pumping of the well treatment particulate not containing the coating of the at least two adjacent polyelectrolyte layers.

19. The method of 18, wherein the well treatment particulate contains silicon.

20. The method of claim 19, wherein the well treatment particulate is sand.

21. The method of claim 18, wherein the surface of the well treatment particulate is neutral and is modified, prior to forming the first polyelectrolyte layer onto the substrate, to have a positive or negative charge.

* * * * *